United States Patent [19]

Chuan

[11] Patent Number: 5,724,173
[45] Date of Patent: Mar. 3, 1998

[54] OPTICAL SCANNING DEVICE

[76] Inventor: Tsai Shui Chuan, No. 3, Alley 80, Lane 108, Sec. 1, Kuang-Fu Road, Hsin-Chu, Taipei, Taiwan

[21] Appl. No.: 791,649

[22] Filed: Nov. 25, 1996

[51] Int. Cl.⁶ .................................................. G02B 26/08
[52] U.S. Cl. .......................... 359/210; 359/223; 399/111; 250/234
[58] Field of Search ......................... 359/196–198, 359/201, 209–212, 223; 250/208.1, 216, 234; 358/474, 394, 397; 399/209, 211, 218, 220

[56]     References Cited

U.S. PATENT DOCUMENTS 5,585,627  12/1996  Akutsu et al. ......................... 359/224

*Primary Examiner*—James Phan
*Attorney, Agent, or Firm*—Pro-Techtor International

[57]     ABSTRACT

The present invention relates to an optical scanning device for scanning picture elements of a sheet of paper, comprising: a first moving element, carrying a light source and a mirror and being movable parallel to the sheet; a second moving element, carrying a lens and a light detecting element and moving with the same velocity as the first moving element into the opposite direction thereof; a set of mirrors, which are mounted in a fixed position and reflect light coming from the first mirror into the opposite direction onto the lens, wherein light from the picture elements is focused by the lens on the light detecting device; and a driving device, having a driving-belt or a wire cable and driving the first and second moving elements with the same velocity into opposite directions.

8 Claims, 10 Drawing Sheets

ONAL SCANNING DEVICE

BACKGROUND OF THE INVENTION

1. Field of the Invention

The present invention relates to an optical scanning device, particularly to an optical scanning device for use in flatbed scanners.

2. Description of Related Art

As shown in FIG. 1, a conventional optical reflection scanning device for use in flatbed scanners comprises a pressing plate 1, a transparent plate 2, on which the sheet 3 of paper to be scanned is laid, and a scanning device 4, which, driven by a driving device (not shown), moves along the transparent plate 2 and aims at the picture elements of the sheet 3 to be scanned. The scanning device 4 in turn comprises a light source 6, which projects light on the sheet 3, several mirrors 7, which determine the path of the light reflected from the sheet 3, a lens 8, and a light detecting device 9, onto which the light reflected from the sheet 3 is concentrated and which transforms the light into electronic signals.

As shown in FIG. 2, a conventional optical transmission scanning device for use in flatbed scanners has a transparent pressing plate 1a for holding the sheet 3 to be scanned against the transparent plate 2 below the transparent pressing plate 1a. The sheet 3 is illuminated from above by a light source 6a, which is driven by a driving device (not shown). The light from a light source 6a passes through the page with the sheet 3, is reflected by the mirrors 7 and concentrated by the lens 8 on the light detecting device 9.

In flatbed scanners, as shown in FIGS. 1 and 2, the light source 6, the mirrors 7, the lens 8 and the light detecting device 9 are assembled into one unit. The resulting scanning device 4 has a large volume. Moreover, it has to be moved along the sheet 3 for scanning. So a large space has to be provided for the scanning device 4.

Referring to FIG. 3, in another type of flatbed scanners the lens 8 and the light detecting device 9 are fixed to the casing of the scanner. This type of scanner has a first moving system 10, on which the light source 6 and a mirror 11 are mounted, and a second moving system 12, on which several mirrors 13 are mounted. The first and second moving system 10, 12 are guided by a guiding element 14 and move parallel to the sheet 3 to be scanned. The path of the light in this type of scanner is as follows: The light source 6 illuminates the surface of the page containing the sheet 3. The light is reflected there and further reflected on the mirror 11. Then the light path is parallel to the page of the sheet 3. After being reflected on the mirrors 13, the light proceeds in the opposite direction, passes through the lens 8, and reaches the light detecting device 9.

The first and second moving system 10, 12 are guided by the same guiding element 14 and are driven by the same driving element (not shown). For the picture elements within the sheet 3 that are just scanned to stay in the focal point of the lens 8, the second moving system 12 has to be driven with exactly half of the velocity of the first moving system 10. Then the length of the optical path from the scanned picture elements to the lens will be constant.

The advantage of this type of flatbed scanners lies in a much smaller volume needed to accommodate the optical elements. However, the mechanical precision requirements for driving the first and second moving systems 10, 12 are high.

SUMMARY OF THE INVENTION

The main object of the present invention is to provide an optical scanning device with a reduced volume.

Another object of the present invention to provide an optical scanning device using a simple and cost-effective optical transmission system.

The present invention can be more fully understood by reference to the following description and accompanying drawings.

DETAILED DESCRIPTION OF THE PREFERRED EMBODIMENTS

Referring to FIGS. 4 to 7, showing the present invention in a first embodiment, the technology employed in the present invention can be applied to flatbed scanners that use reflection and transmission as well as to flatbed copiers. In the following, the explanation of the present invention, as applied to flatbed scanners, will suffice.

The main distinguishing characteristic of the present invention, as compared to a conventional scanning device, lies in an arrangement, wherein a light source and a mirror are built into a first moving element, moving along the sheet to be scanned, and wherein a lens and a light detecting element are built into a second moving element, moving with the same velocity as the first moving element into the opposite direction, while further mirrors are fixed to the inner side of the casing of the scanner.

With this arrangement of parts, the present invention needs only a small volume, while the driving system for the first and second moving elements is kept simple.

Figure 1:
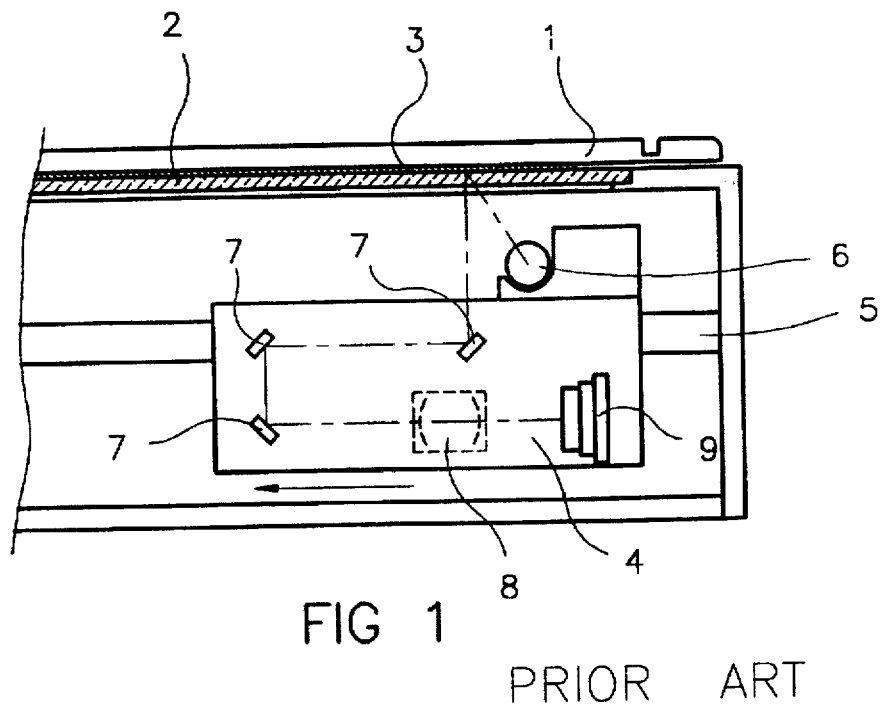
FIG. 1 (prior art) is a schematic illustration of a conventional optical reflection scanning device.
Figure 2:
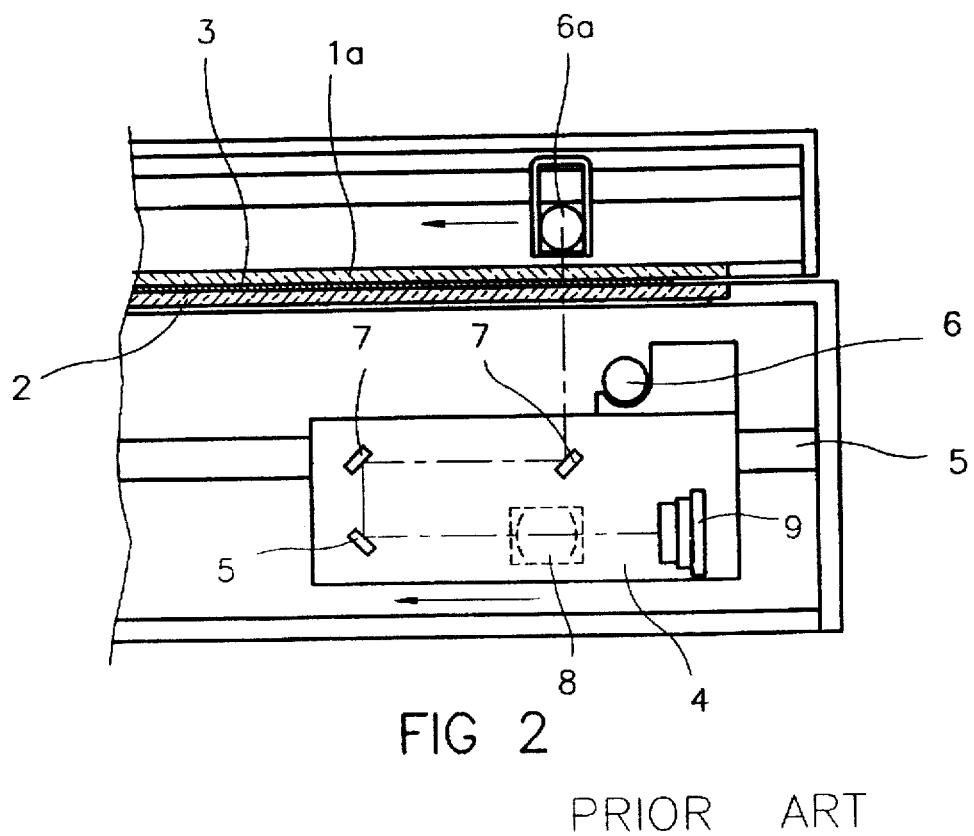
FIG. 2 (prior art) is a schematic illustration of a conventional optical transmission scanning device.
Figure 3:
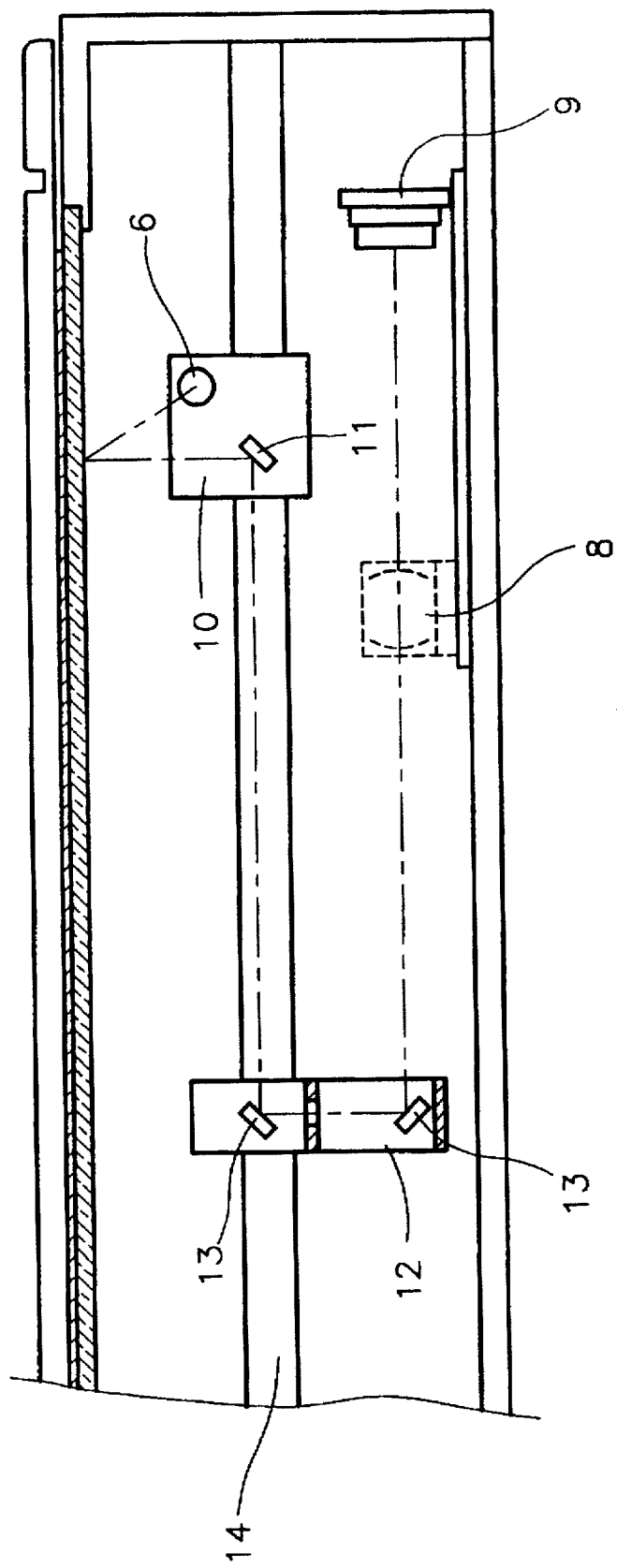
FIG. 3 (prior art) is a schematic illustration of another conventional optical reflection scanning device.
Figure 4:
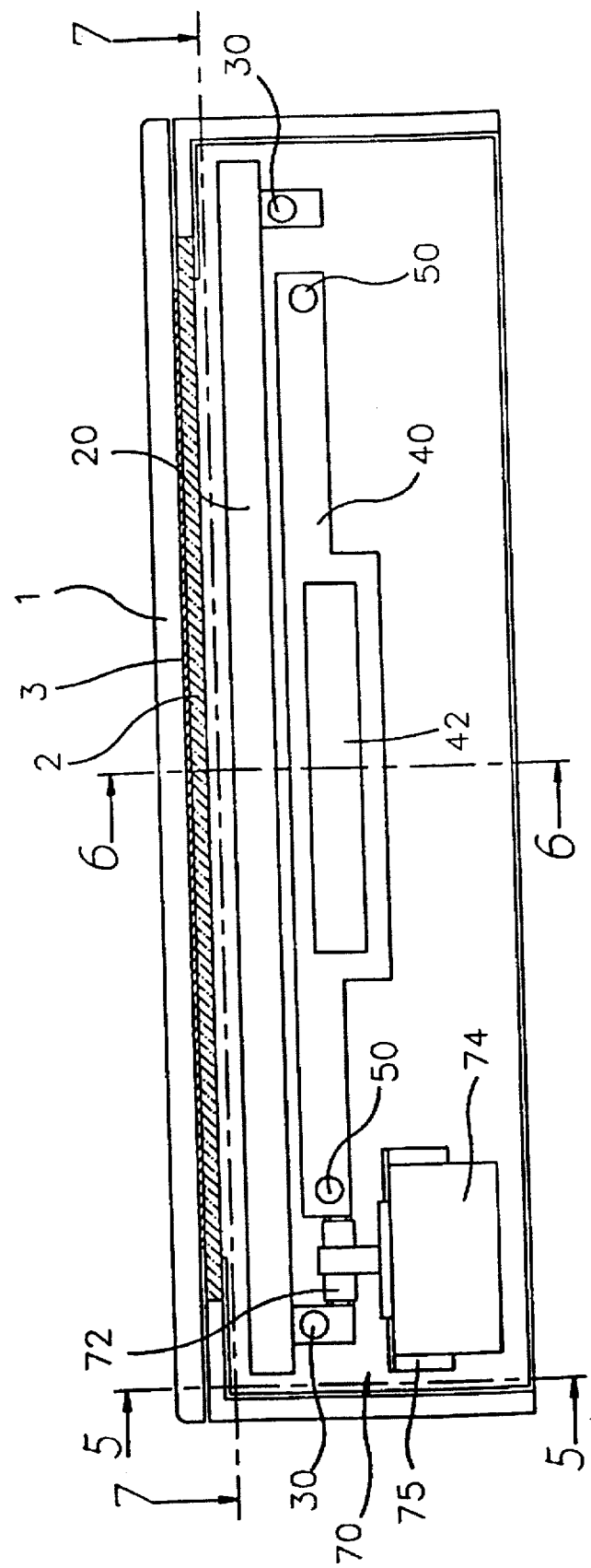
FIG. 4 is a cross-sectional view of the optical scanning device of the present invention in a first embodiment.
Figure 5:
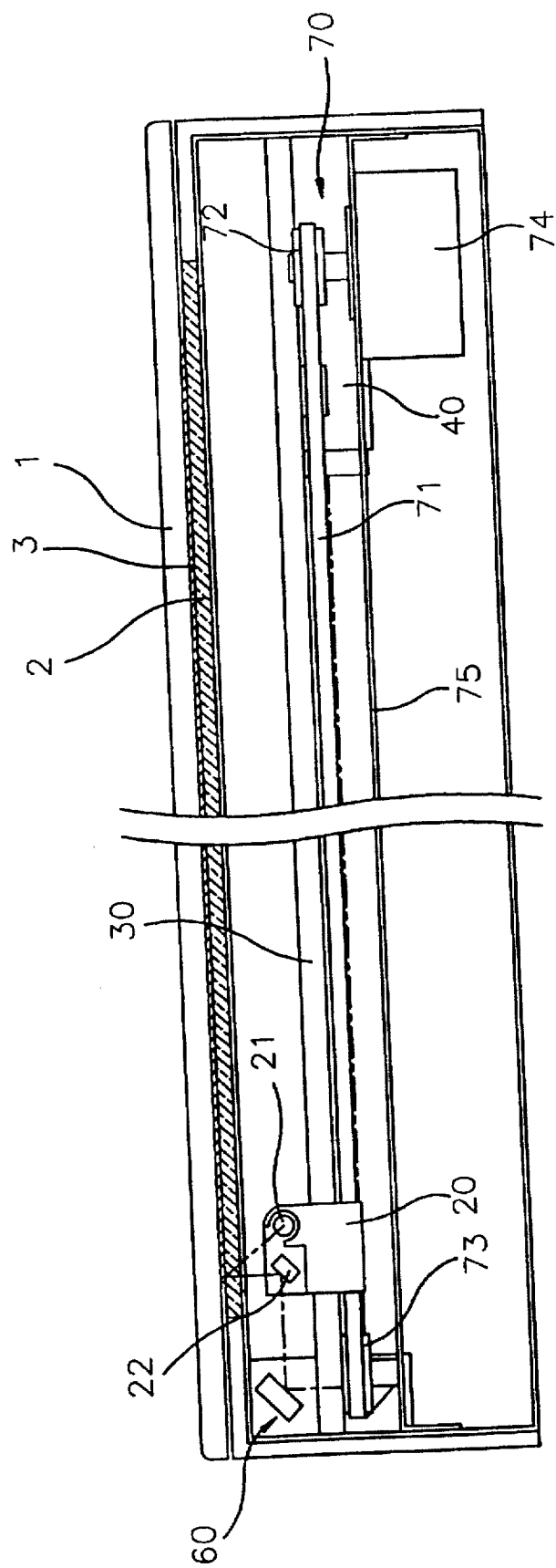
FIG. 5 is a longitudinal sectional view, taken along the line A—A in FIG. 4.

Referring to FIGS. 4 and 5, the optical scanning device of the present invention comprises: a pressing plate 1; a transparent plate 2, on which a sheet 3 of paper or other writable material is laid, while the pressing plate 1 holds the sheet 3 from above; a first moving element 20, located below the sheet 3, with a light source 21 being mounted thereon to illuminate the picture elements of the sheet 3 that are to be scanned and with a mirror 22 being mounted thereon to change the path of the light reflected from the sheet 3 into the moving direction of the first moving element 20; a first guiding element 30, which guides the first moving element 20 in a reciprocating movement parallel to the sheet 3; a second moving element 40, which moves simultaneously with the first moving element 20, but in the opposite direction, guided by a second guiding element 50; a set of lenses 60, mounted in a fixed position; and a driving device 70, driving the movement of the first and second moving elements 20, 40.

It must be noted that in the embodiment described here the light source 21 is connected to the first moving element 20. Under certain circumstances, e.g., when scanning a transparent, the light source 21 is mounted separate from the first moving element 20 and its movement is driven by another driving device. The driving devices are coordinated, such that the movements of the first moving element 20 and the light source 21 are still simultaneous and parallel to each other.

Figure 6:
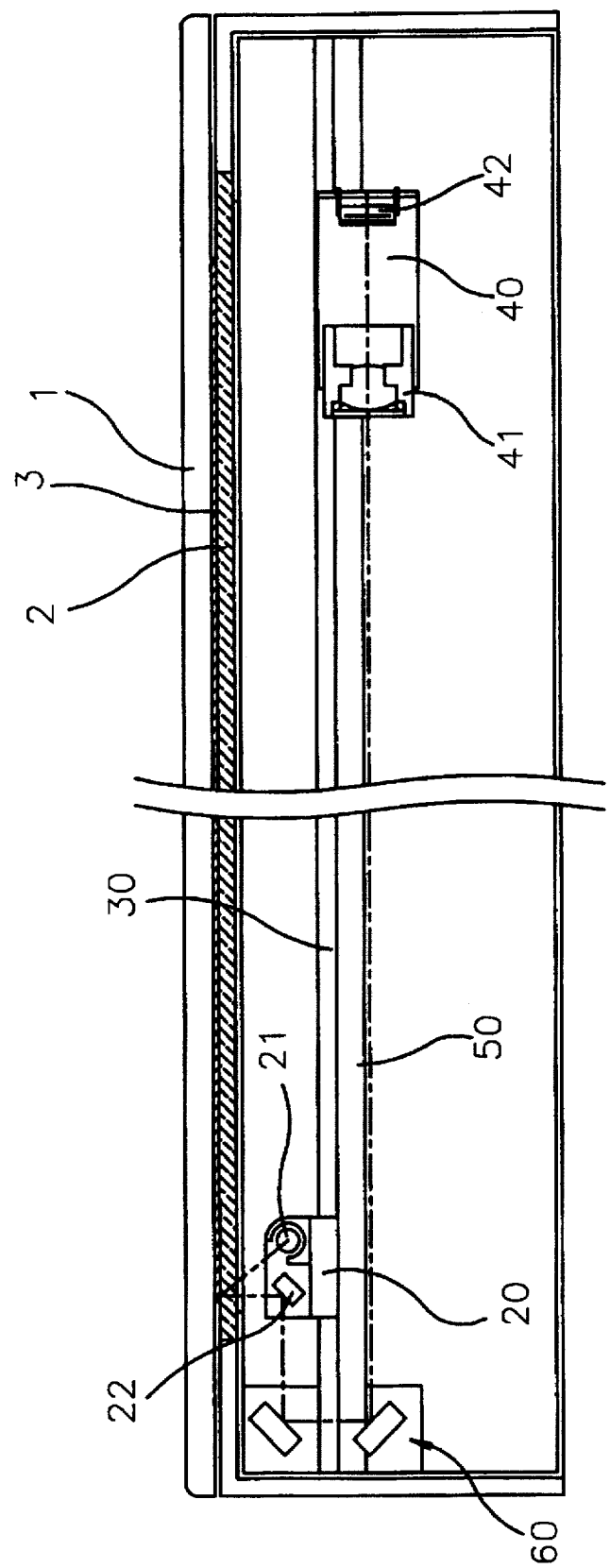
FIG. 6 is a longitudinal sectional view, taken along the line B—B in FIG. 4.

Referring to FIG. 6, on the second moving element 40 a lens 41 and a light detecting element 42 are mounted. The set of mirrors 60 is mounted in a fixed position, in order to reflect the light coming from the mirror 22 on the first moving element 20 onto the lens 41 on the second moving element 40, from where the light is transmitted to the light detecting element 42.

Figure 7:
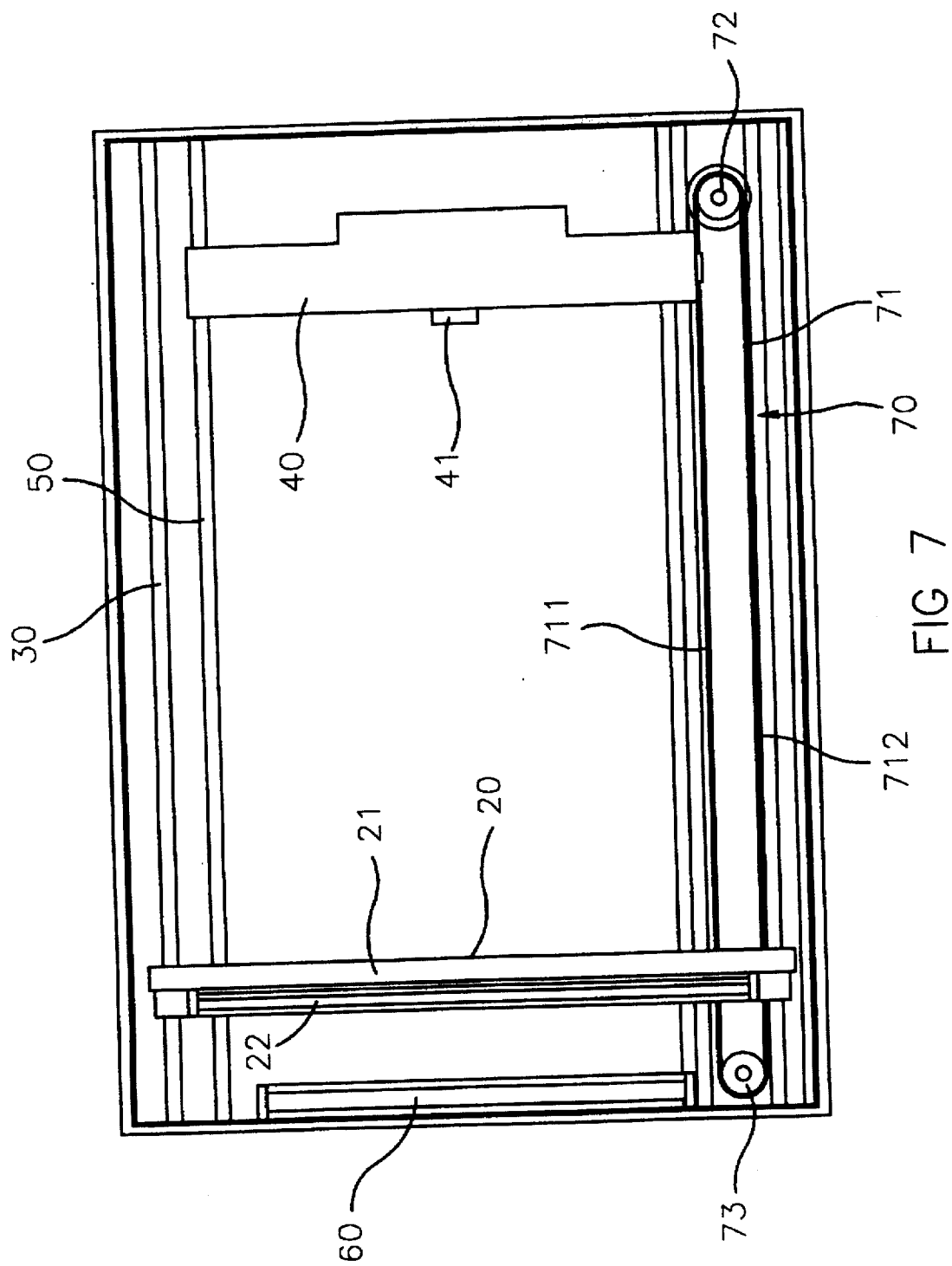
FIG. 7 is a planar sectional view, taken along the line C—C in FIG. 4.

The driving device 70 drives the movement of the first and second moving elements 20, 40 with the same velocity, but in opposite directions along the first and second guiding elements 30, 50, respectively. As shown in FIGS. 4, 5, and 7, the driving device 70 has a driving-belt 71, which is endless and is laid around a driving reel 72 and a reel 73, such that there are two straight sections 711, 712 of the driving-belt 71 between the reels 72, 73. The straight sections 711, 712 are parallel to the guiding elements 30, 50. The first moving element 20 is attached to the straight section 711, and the second moving element 40 is attached to the straight section 712. The driving belt 71 has teeth on its inner side, which engage with teeth on the perimeters of the reels 72, 73. The driving device 70 is further provided with a motor 74, which drives the rotation of the reel 72, and a frame to fix its parts.

The motor 74 drives the rotation of the reel 72 either directly or indirectly via a gear. When the reel 72 rotates, it takes the driving-belt 71 with it. Then, as sown in FIG. 7, the two straight sections 711 and 712 move with the same velocity into opposite directions, taking the first and second moving elements 20 and 40 with them. Thus the first and second moving elements 20 and 40 move with the same velocity in opposite directions along the guiding elements 30 and 50, respectively.

During the scanning process the first moving element 20 moves from one end of the sheet 3 along the first guiding element 30 towards the opposite end of the sheet 3. Then the light reflected from the sheet 3 is reflected by the mirror 22 on the first moving element 20 into the direction of the movement of the first moving element 20.

The light that is reflected from the mirror 22 again changes its path into the opposite direction after reflection on the set of mirrors 60. Thereby it is directed to the lens 41 on the second moving element 40. The lens 41 focuses the light onto the light detecting element 42.

Since the first and second moving elements 20 and 40 move with the same velocity in opposite directions, the length of the light path between the mirror 22 and the lens 41 is constant during the scanning process. So the picture elements of the sheet 3, once adjusted, will always be focused on the light detecting device 42.

Figure 8:
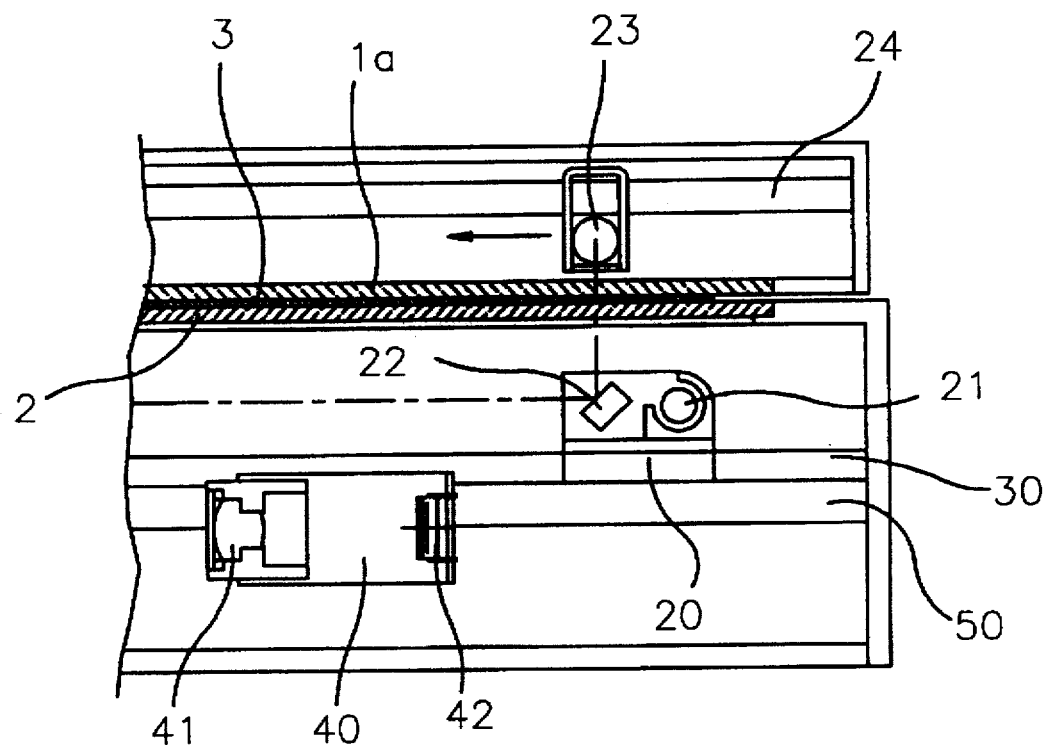
FIG. 8 is a schematic illustration of the usage of the present invention in a transmission flatbed scanner.
Figure 9:
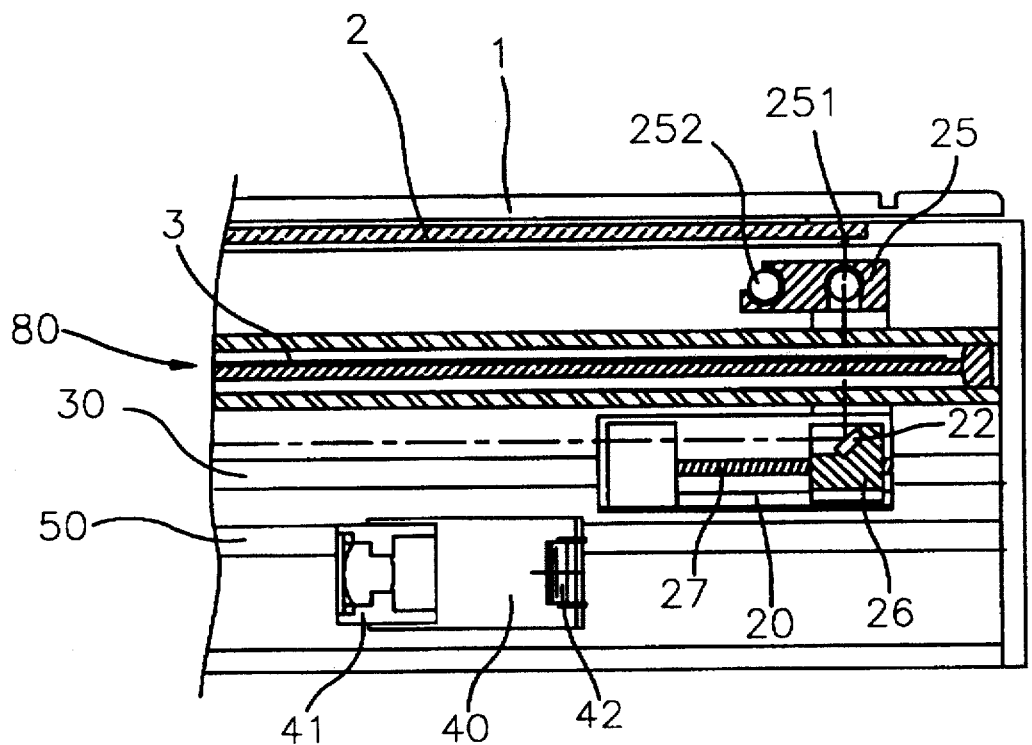
FIG. 9 is a schematic illustration of the usage of the present invention in another type of transmission flatbed scanner.

FIGS. 8 and 9 show the present invention applied to transmission flatbed scanners. An additional light source 23 illuminates the sheet 3 from above. It is mounted separate from the first moving element 20, yet moves simultaneously with the first moving element, driven by another driving device (not shown). In another system, shown in FIG. 9, a light source 25, which is located below the transparent plate 2, is connected to the first moving element 20 and taken along by the first moving element 20. For scanning by transmission of light, the sheet 3 is laid on a transparent plate 80, which is located below the light source 25. The light source 25 has a first lamp 251 for scanning by transmission and a second lamp 252 for scanning by reflection. The first moving element 20 is further provided with a gliding part, which carries the mirror 22 and which glides on the guiding element 30, driven by a threaded shaft 27. Thus the position of the mirror 22 is adjustable to suit the positions of the first lamp 251 or the second lamp 252, as required. Thereby scanning by transmission and by reflection can be achieved in a single apparatus.

Figure 10:
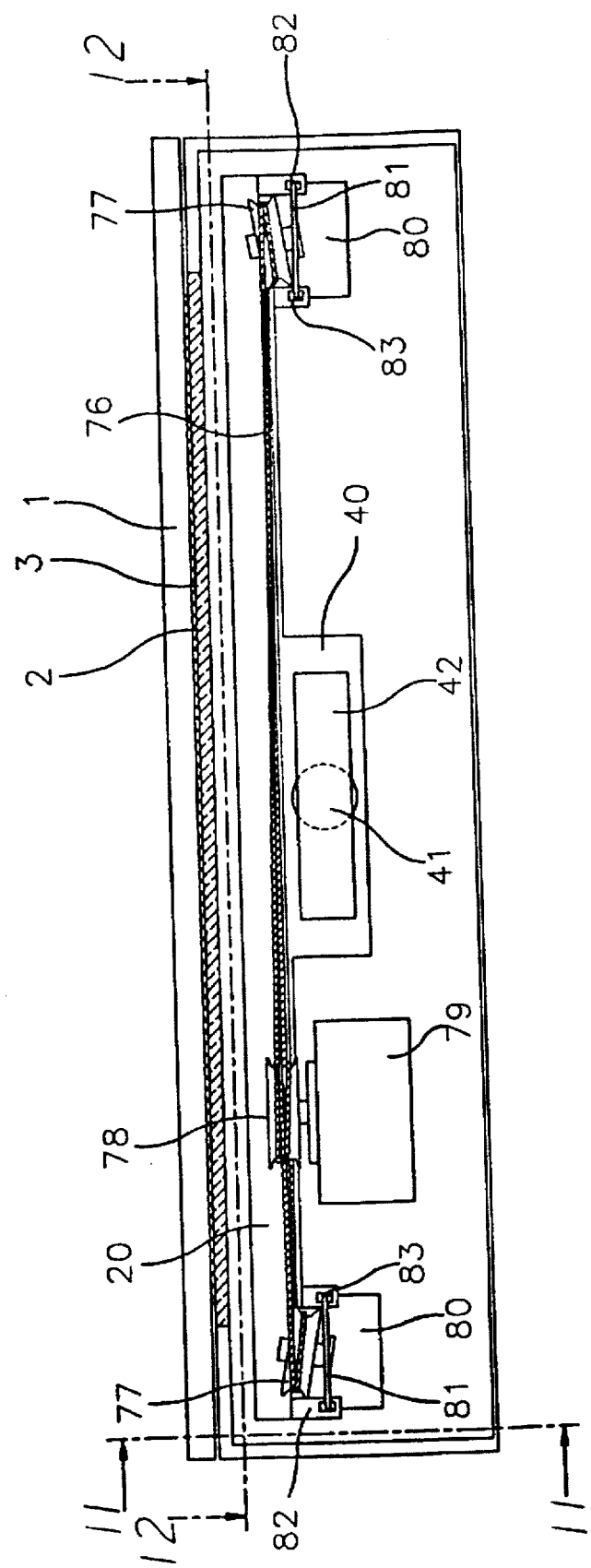
FIG. 10 is a cross-sectional view of the optical scanning device of the present invention in a second embodiment.
Figure 11:
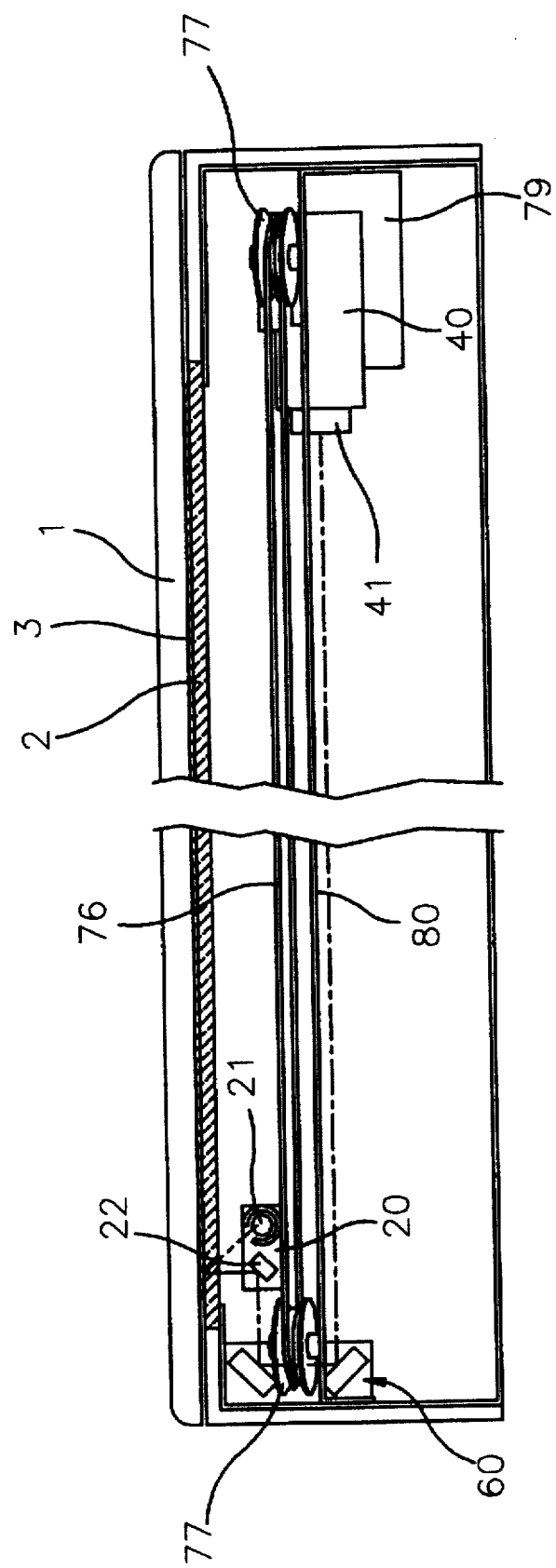
FIG. 11 is a longitudinal sectional view, taken along the line B—B in FIG. 10.
Figure 12:
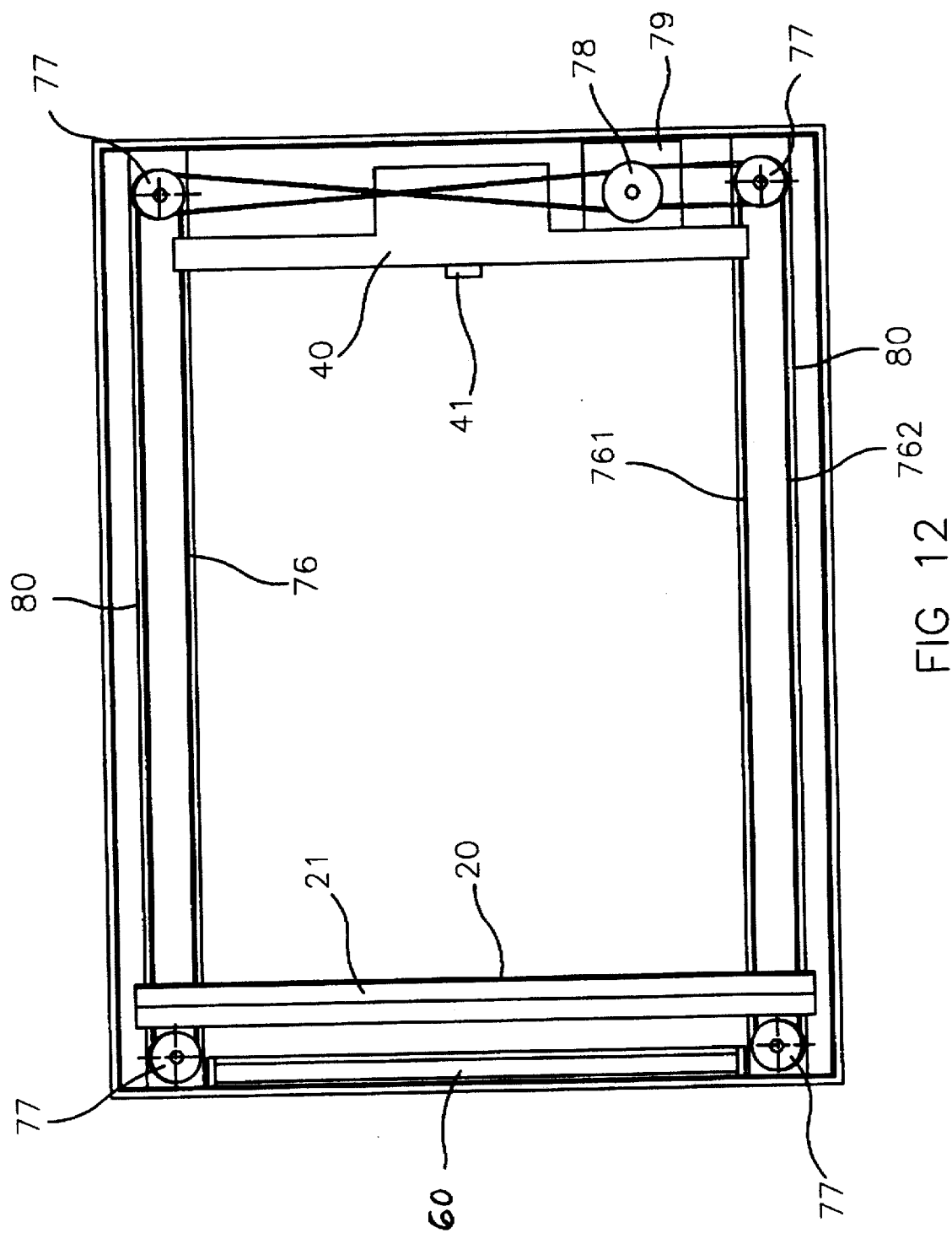
FIG. 12 is a planar sectional view, taken along the line C—C in FIG. 10.

The driving device 70 may be varied, as shown in FIGS. 10 to 12. Therein, the driving device 70 comprises a wire cable 76, several reels 77, a driving reel 78, driving the wire cable 76, a motor 79, driving the driving reel 78, and two frames 80, holding the reels 77.

A further characteristic of this embodiment is that the first and second moving elements 20, 40 are guided by the two frames 80, so the first and second guiding elements 30, 50 are not needed. As shown in FIGS. 10 to 12, each of the frames 80 has a horizontal part 81. The first moving part 20 is by way of two link elements 82 against the outer edge of each of the horizontal parts 81, such that it is guided by the horizontal parts 81 in its movement along the sheet 3.

Similarly, the second moving part 40 leans by way of two link elements 83 against the inner edge of each of the horizontal parts 81, such that it is guided by the horizontal parts 81 in its movement along the sheet 3.

As shown in FIG. 12, after the wire cable is wound around the reels 77, it has two pairs of straight sections 761, 762. The straight sections 761, 762 of each pair are parallel to the movement of the first and second moving parts 20, 40 and move into opposite directions, taking the first and second moving parts 20, 40 with them. Thus it is ensured that the first moving part 20 and the second moving part 40 move into opposite directions at the same velocity.

What is claimed is:

1. An optical scanning device for scanning picture elements of a sheet of paper, comprising:

a first guiding element for providing mechanical guidance on a straight path parallel to said sheet;

a first moving element, which is movable back and forth, guided by said first guiding element;

a first mirror, which is mounted on said first moving element, reflecting light from said picture elements of said sheet into a direction parallel to the movement of said first moving element;

a light source, illuminating said picture elements of said sheet and moving synchronously with said first moving element;

a second guiding element for providing mechanical guidance on a straight path parallel to said sheet;

a second moving element, which is movable back and forth, guided by said second guiding element;

a lens and a light detecting device, which are mounted on said second moving element;

a set of mirrors, which are mounted in a fixed position and reflect light coming from said first mirror into the opposite direction onto said lens, wherein light from said picture elements is focused by said lens on said light detecting device; and a driving device, driving said first moving element along said first guiding element and said second moving element along said second guiding element, such that said first and said second moving elements move with the same velocity into opposite directions.

2. An optical scanning device according to claim 1, wherein said driving device further comprises:

a driving-belt, having a first straight section and a second straight section, said first straight section moving parallel to and being attached to said first moving element and said second straight section moving parallel to and being attached to said second moving element;

a driving reel, driving said driving-belt, and at least one reel, said driving-belt being laid around said driving reel and said reel; and a motor, driving said driving reel.

3. An optical scanning device according to claim 1, wherein said driving device comprises a motor driving a driving reel directly or indirectly via a gear, which changes the rotational.

4. An optical scanning device according to claim 1, wherein said driving device further comprises:

a wire cable, having at least two straight sections, among said straight sections having a first straight section, and a second straight section, said first straight section moving parallel to and being attached to said first moving element and said second straight section moving parallel to and being attached to said second moving element;

a plurality of reels, around which said wire cable is laid;

a driving reel, driving said driving-belt; and a motor, driving said driving reel;

wherein said first and said second straight sections move with the same velocity into opposite directions, such that said first and said second moving elements move with the same velocity into opposite directions.

5. An optical scanning device according to claim 4, wherein said motor drives said driving reel directly or indirectly via a gear, wherein the rotational velocity is changed.

6. An optical scanning device according to claim 1, wherein said light source is attached to said first moving device.

7. An optical scanning device according to claim 1, wherein said light source is mounted separate from said first moving device and driven by another driving device, wherein said light source and said first moving device undergo a parallel, synchronous movement.

8. An optical scanning device according to claim 1, wherein said first guiding element and said second guiding element are combined into one structural element.

* * * * *